(12) United States Patent
Kinoshita et al.

(10) Patent No.: US 8,012,560 B2
(45) Date of Patent: Sep. 6, 2011

(54) OPTICAL DISC AND METHOD OF MANUFACTURING SAME

(75) Inventors: Toshiro Kinoshita, Tokyo (JP); Masayuki Taniguchi, Tokyo (JP); Hiroshi Umeyama, Saitama (JP); Takeshi Yamasaki, Yokohama (JP); Tomomi Yukumoto, Chiba (JP)

(73) Assignees: Toppan Printing Co., Ltd., Tokyo (JP); Sony Corporation, Tokyo (JP)

( * ) Notice: Subject to any disclaimer, the term of this patent is extended or adjusted under 35 U.S.C. 154(b) by 1080 days.

(21) Appl. No.: 11/578,079

(22) PCT Filed: Apr. 13, 2005

(86) PCT No.: PCT/JP2005/007138
§ 371 (c)(1),
(2), (4) Date: Oct. 12, 2006

(87) PCT Pub. No.: WO2005/101395
PCT Pub. Date: Oct. 27, 2005

(65) Prior Publication Data
US 2007/0223356 A1 Sep. 27, 2007

(30) Foreign Application Priority Data
Apr. 14, 2004 (JP) .................. 2004-119523

(51) Int. Cl.
*B32B 3/02* (2006.01)
*G11B 7/24* (2006.01)
(52) U.S. Cl. .............. 428/64.4; 428/65.2; G9B/7.171; G9B/7.182; G9B/7.185; 156/182; 156/277

(58) Field of Classification Search ............... 428/64.7, 428/65.1, 64.4, 65.2; 528/87, 123; G9B/7.171, G9B/7.182, 7.185; 156/182, 277
See application file for complete search history.

(56) References Cited

U.S. PATENT DOCUMENTS 2,615,008 A * 10/1952 Greenlee ........................ 528/87
5,798,161 A * 8/1998 Kita et al. ...................... 428/64.1
5,820,961 A * 10/1998 Maruyama et al. .......... 428/64.1
(Continued)

FOREIGN PATENT DOCUMENTS

EP 0 892 109 A1 1/1999
(Continued)

OTHER PUBLICATIONS

Machine translation of detailed description of JP 07-272442 A. Created on Apr. 19, 2010.*
(Continued)

Primary Examiner — Gerard T Higgins
(74) Attorney, Agent, or Firm — Staas & Halsey LLP

(57) ABSTRACT

An optical disc (10) includes a substrate (11), which is formed from either a resin-impregnated paper produced by impregnating a paper with a resin, or a resin-coated paper produced by coating a surface of a paper with a resin, and a recording layer (13), wherein the resin contains at least one resin selected from the group consisting of polycarbonates, bisphenol A epoxy resins, copolymers of methyl methacrylate and styrene, and copolymers of acrylonitrile and styrene. Furthermore, a method of manufacturing an optical disc (20) includes: providing a recording layer sheet by forming tracks on a recording base material; and bonding the recording layer sheet to a resin-impregnated paper or a resin-coated paper, thereby providing a recording layer (13) formed from the recording layer sheet on the substrate (11).

18 Claims, 6 Drawing Sheets

U.S. PATENT DOCUMENTS

| | | | |
|---|---|---|---|
| 6,463,026 B1 * | 10/2002 | Anderson | 720/719 |
| 6,977,107 B1 * | 12/2005 | Satou et al. | 428/64.1 |
| 2006/0133256 A1 | 6/2006 | Kinoshita et al. | |

FOREIGN PATENT DOCUMENTS

| | | | |
|---|---|---|---|
| JP | 60074137 A * | 4/1985 | |
| JP | 05-258349 | 10/1993 | |
| JP | 07-032776 | 2/1995 | |
| JP | 07-040688 | 2/1995 | |
| JP | 07-266771 | 10/1995 | |
| JP | 07272442 A * | 10/1995 | |
| JP | 09-231337 | 9/1997 | |
| JP | 11-70630 | 3/1999 | |
| JP | 11-185291 | 7/1999 | |
| JP | 11-198575 | 7/1999 | |
| JP | 2000-30302 | 1/2000 | |
| JP | 2000011448 A * | 1/2000 | |
| JP | 2002-351291 | 12/2002 | |
| JP | 2002-367234 | 12/2002 | |
| WO | 2004/068484 A1 | 8/2004 | |

OTHER PUBLICATIONS

Machine translation of detailed description of JP 2000-011448 A. Created on Apr. 19, 2010.*
Machine translation of detailed description of JP 2000-030302 A. Created on Apr. 19, 2010.*
Verified translation of JP 60-074137 A from Apr. 2010.*
Japanese Office Action issued on May 7, 2009 in corresponding Japanese Patent Application 2004-119523.
Japanese Office Action issued on Nov. 18, 2008 in corresponding Japanese Patent Application 2004-119523.

* cited by examiner ial; and bonding the substrate and the recording layer sheet

OPTICAL DISC AND METHOD OF MANUFACTURING SAME

TECHNICAL FIELD

The present invention relates to an optical disc, such as a Blu-ray disc (BD) or Digital Versatile Disc (DVD), and a method of manufacturing such a disc.

Priority is claimed on Japanese Patent Application No. 2004-119523, filed Apr. 14, 2004, the content of which is incorporated herein by reference.

BACKGROUND ART

In order to enable stable reading and writing operations, substrate materials for conventional optical discs must contain minimal quantities of foreign substances or impurities, exhibit a high level of transparency, a small birefringence, a low level of moisture absorption to prevent deformation of the optical disc, and excellent heat resistance, and must also exhibit favorable fluidity and excellent releasability to ensure favorable molding characteristics, and consequently polycarbonates and epoxy resins and the like are widely used (for example, see Patent Document 1).

Polycarbonates and epoxy resins can be heat molded, and may also be used to form an optical disc substrate by laminating two layers together. Although optical discs with this type of substrate exhibit excellent strength, attempts to destroy such discs by physical force at the time of disposal in order to protect the information contained thereon either result in failure to destroy the disc, or even if destruction is successful, generate sharp fragments which must be handled with care. Furthermore, even if attempts are made to separate and recover the materials such as metals used in the reflective layer and the recording layer, to enable these materials to be reused, separating the various materials is impossible, making recycling extremely difficult.

Another problem that arises with conventional optical discs is that although printing methods, such as silk screen printing, are the most commonly used when lettering or images are printed on the surface of the disc, silk screen printing is unable to generate finely detailed images.

Furthermore, with silk screen printing, in order to enable different lettering or images to be printed on each disc, as in the case of serial numbers, the printing plate must be changed on each occasion, so that in the case of conventional optical discs, the printing of variable information onto each disc is not feasible from a practical viewpoint.

Patent Document 1: Japanese Unexamined Patent Application, First Publication No. H05-258349

DISCLOSURE OF INVENTION

Problems to be Solved by the Invention

Accordingly, an object of the present invention is to provide an optical disc that exhibits the same level of performance as conventional discs, is able to be readily destroyed by cutting or peeling to enable information to be protected at the time of disposal, and in which the reflective layer and the recording layer can be readily separated from the substrate, meaning disposal of the separated substrate has minimal impact on the environment, as well as a method of manufacturing such an optical disc.

Furthermore, another object of the present invention is to provide an optical disc with a finely detailed image printed thereon, as well as a method of manufacturing an optical disc that enables low-cost printing of a finely detailed image, and enables variable information to be provided by printing.

Means for Solving the Problems

In other words, an optical disc of the present invention includes a substrate which is formed from either a resin-impregnated paper produced by impregnating a paper with a resin, or a resin-coated paper produced by coating the surface of a paper with a resin, and a recording layer provided on at least one surface of the substrate, including at least one resin selected from the group consisting of polycarbonates, bisphenol A epoxy resins, copolymers of methyl methacrylate and styrene, and copolymers of acrylonitrile and styrene.

The centerline average roughness Ra of at least one surface of the aforementioned substrate is preferably no higher than 0.5 µm, and the maximum height Rmax is preferably no higher than 6.0 µm.

Furthermore, a printed layer is preferably provided on the opposite surface of the substrate to the surface on which the recording layer is provided.

Furthermore, the recording layer is preferably provided on both surfaces of the substrate.

Furthermore, the optical disc preferably includes at least one protective layer that protects the recording layer.

Furthermore, the recording layer has a recording layer base material that functions as a support for the recording layer, and this recording layer base material is preferably formed from a resin film.

Furthermore, the aforementioned printed layer has a printing base material that functions as a support for the printed layer, and this printing base material is preferably formed from a resin film.

Furthermore, protective layers are preferably provided on both surfaces of the optical disc.

Furthermore, release layers are preferably provided between the aforementioned substrate, and the recording layer and printed layer.

A method of manufacturing an optical disc according to the present invention includes: providing a substrate formed from either a resin-impregnated paper produced by impregnating a paper with a resin, or a resin-coated paper produced by coating the surface of a paper with a resin; providing a recording layer sheet by forming tracks on a recording layer base material; and bonding the substrate and the recording layer sheet together, thereby providing a recording layer formed from the recording layer sheet on the substrate.

Furthermore, a method of manufacturing an optical disc of the present invention preferably further includes: providing a printed sheet by printing onto a printing base material; and bonding the aforementioned substrate and the printed sheet together, thereby providing a printed layer formed from the printed sheet on the substrate.

Furthermore, a method of manufacturing an optical disc of the present invention preferably further includes bonding a protective film to the aforementioned recording layer, thereby providing a protective layer formed from the protective film on the recording layer.

Furthermore, in a method of manufacturing an optical disc according to the present invention, the aforementioned providing the substrate preferably includes forming a release layer on at least one surface of the aforementioned resin-impregnated paper or resin-coated paper.

Furthermore, in a method of manufacturing an optical disc according to the present invention, each of the sheets is preferably produced as a wound roll, with the sheets from these wound rolls are then being bonded together.

Furthermore, the aforementioned providing the printed sheet preferably includes printing variable information that is varied for each produced optical disc onto the printing base material.

Advantageous Effects of the Invention

An optical disc of the present invention uses, as a substrate, either a resin-impregnated paper produced by impregnating a paper with a resin, or a resin-coated paper produced by coating the surface of a paper with a resin, and the resin includes at least one resin selected from the group consisting of polycarbonates, bisphenol A epoxy resins, copolymers of methyl methacrylate and styrene, and copolymers of acrylonitrile and styrene. As a result, the optical disc exhibits the same level of performance as conventional discs, is able to be readily destroyed by cutting or peeling to enable information to be protected at the time of disposal, and provides a structure in which the recording layer can be readily separated from the substrate, the reflective layer and the recording layer can be separated and recovered with favorable efficiency and in a form that provides favorable transportation properties, and the separated substrate can be disposed of by incineration or ground burial, meaning the impact on the environment is minimal.

Furthermore, if the centerline average roughness Ra of at least one surface of the substrate is no higher than 0.5 μm, and the maximum height Rmax is no higher than 6.0 μm, then the surface smoothness improves, enabling a further improvement in the performance of the optical disc.

Furthermore, if a printed layer is provided on the opposite surface of the substrate to the surface on which the recording layer is provided, then water and moisture absorption by the substrate can be suppressed, and deformation of the optical disc, such as warping, can also be suppressed.

Similarly, if recording layers are provided on both surfaces of the substrate, then water and moisture absorption by the substrate can be suppressed, and deformation of the optical disc, such as warping, can also be suppressed.

Furthermore, if the optical disc also includes a protective layer that protects the recording layer, then not only is scratching of the recording layer prevented, but water and moisture absorption by the substrate can be further suppressed, enabling even better suppression of deformation of the optical disc, such as warping.

Furthermore, if the recording layer has a recording layer base material that functions as a support for the recording layer, and this recording layer base material is formed from a resin film, then water and moisture absorption by the substrate can be further suppressed, enabling even better suppression of deformation of the optical disc, such as warping.

Furthermore, if the printed layer has a printing base material that functions as a support for the printed layer, and this printing base material is formed from a resin film, then water and moisture absorption by the substrate can be further suppressed, enabling even better suppression of deformation of the optical disc, such as warping.

Furthermore, if protective layers are provided on both surfaces of the optical disc, then water and moisture absorption by the substrate can be further suppressed, enabling even better suppression of deformation of the optical disc, such as warping.

Furthermore, if a release layer is provided between the substrate and the recording layer and/or printed layer, then the substrate, the recording layer and/or the printed layer can be separated at the time of disposal and disposed of individually, meaning the disposal can be done in the manner best suited to the material of each layer, thereby minimizing the impact on the environment.

Furthermore, in a method of manufacturing an optical disc according to the present invention, because the substrate, the recording layer, and where required the printed layer and protective layer are prepared as corresponding sheets, and these sheets are then bonded together, an optical disc with minimal substrate warping can be produced at low cost.

Furthermore, because one aspect of the method involves providing a printed sheet by printing onto a printing base material, and subsequently bonding this printed sheet to the substrate, a finely detailed image can be obtained at low cost. Furthermore, variable information that is varied for each disc, such as a changing serial number, can be provided on each optical disc by printing.

BRIEF DESCRIPTION OF THE REFERENCE SYMBOLS

Figure 1:
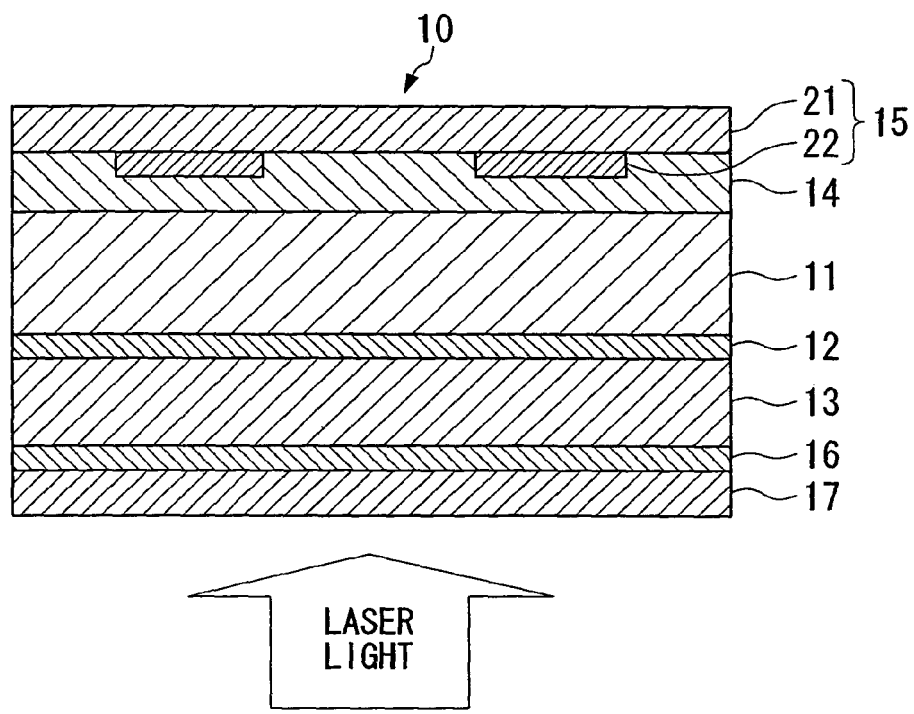
FIG. 1 is a schematic cross-sectional view showing an example of an optical disc of the present invention.

10 Optical disc
11 Substrate
13 Recording layer
15 Printed layer
17 Protective layer
18 Release layer
19 Release layer
20 Optical disc
21 Printing base material
31 Recording layer base material
32 Information pit-forming layer (track)
41 Recording layer base material
42 Information track-forming layer (track)
51 Recording layer base material
52 Information track-forming layer (track)
70 Optical disc
74 Substrate
75 Recording layer
76 Protective layer
77 Protective layer

BEST MODE FOR CARRYING OUT THE INVENTION

As follows is a more detailed description of the present invention.

An optical disc of the present invention includes a substrate, which is formed from either a resin-impregnated paper produced by impregnating a paper with a resin, or a resin-coated paper produced by coating the surface of a paper with a resin, and a recording layer provided on at least one surface of the substrate, and where required may also include a printed layer or a separate recording layer provided on the opposite surface of the substrate to the surface on which the recording layer is provided, and moreover, where required may also include a release layer between the substrate and the recording layer.

Specific examples of possible structural configurations for an optical disc of the present invention include (1) recording layer/substrate, (2) recording layer/substrate/printed layer, (3) recording layer/substrate/recording layer, (4) protective layer/recording layer/substrate/printed layer, (5) protective layer/recording layer/substrate/protective layer, (6) protective layer/recording layer/substrate/recording layer/protective layer, (7) protective layer/recording layer/release layer/substrate/printed layer, (8) protective layer/recording layer/release layer/substrate/release layer/printed layer, and (9) protective layer/recording layer/release layer/substrate/release layer/recording layer/protective layer. If required, an adhesive layer may also be provided between layers for the purpose of bonding each layer. Among them, optical discs that have a recording layer formed on one surface of the substrate and a printed layer or protective layer formed on the other surface, or optical discs that have recording layers formed on both surfaces of the substrate have both surfaces of the substrate covered are consequently preferred as they enable better suppression of water and moisture absorption.

As follows is a description of an optical disc having the layer structure (4) described above, with reference to the drawings.

FIG. 1 is a schematic cross-sectional view showing an example of an optical disc of the present invention, and this optical disc 10 includes a substrate 11 that is formed from a resin-impregnated paper or a resin-coated paper, a recording layer 13 that is bonded to one surface of the substrate 11 via an adhesive layer 12, a printed layer 15 that is bonded to the other surface of the substrate 11 via an adhesive layer 14, and a protective layer 17 that is bonded to the recording layer 13 via an adhesive layer 16.

Substrate

The substrate 11 ensures the necessary strength required of the optical disc, meaning the substrate 11 must exhibit favorable rigidity, together with favorable moisture and water resistance. Accordingly, in the present invention, a resin-impregnated paper produced by impregnating a paper with a resin, or a resin-coated paper produced by coating the surface of a paper with a resin is used as the substrate. In a resin-impregnated paper or a resin-coated paper, the paper functions as a reinforcing material, thereby providing satisfactory rigidity, and because the paper is either impregnated with a resin or surface-coated with a resin, the substrate exhibits favorable moisture and water resistance, has excellent dimensional stability, suffers minimal warping, and exhibits favorable surface smoothness. Furthermore, because paper is used as a production material, the substrate can be cut with scissors or the like, meaning destruction of the optical disc for the purposes of protecting information is a simple task. Furthermore, the optical disc can be readily disposed of by incineration or the like, and the impact on the environment upon disposal is minimal.

Resin-impregnated Paper

There are no particular limitations on the paper within the resin-impregnated paper, provided it is a pulp-based paper. Examples of suitable papers include 100% virgin pulp paper, clay coated news back board that contains recycled paper, and papers in which one side has been subjected to clay coat treatment. Furthermore, papers produced from wood chips instead of pulp, and papers produced from non-wood-based materials such as kenaf are also suitable. In addition, vulcanized fiber produced by using zinc chloride or the like to convert the pulp to a gelatinous form which is then bonded together may also be used. From the viewpoints of achieving favorable rigidity of the resin-impregnated paper, and ensuring ready impregnation of the resin into the paper, the apparent specific gravity (grammage) of the above papers is preferably within a range from 20 to 600 $g/m^2$.

The resin of a resin-impregnated paper provides the substrate 11 with the properties required of an optical disc substrate, such as strength, rigidity, moisture and water resistance, dimensional stability and surface smoothness, and this resin includes at least one resin selected from the group consisting of polycarbonates, bisphenol A epoxy resins, copolymers of methyl methacrylate and styrene, and copolymers of acrylonitrile and styrene.

Examples of suitable methods of impregnating the paper with the resin include methods in which the paper is immersed in either a resin solution or a liquid resin; methods in which a resin solution or a liquid resin is applied to the paper; methods in which a resin is added to the pulp during papermaking (internal addition); and methods in which a resin is sprayed onto the pulp during papermaking.

In order to prevent moisture absorption by the paper, an organic solvent such as an alcohol is preferably used as the solvent in the resin solution. Furthermore, in those cases where a resin solution or a liquid resin is applied to the paper, application is preferably done to both sides of the paper.

From the viewpoints of rigidity of the resin-impregnated paper, productivity, and ease of disposal, the resin content (the dry weight of resin excluding the organic solvent) within the resin-impregnated paper (100% by weight), is preferably within a range from 1 to 10% by weight, and even more preferably from 3 to 10% by weight.

Once the resin has been impregnated into the paper, the resin-impregnated paper can be obtained by curing, drying or solidifying the resin as required.

From the viewpoints of ensuring favorable strength for the resulting optical disc, and meeting the optical disc specifications, the thickness of the thus obtained resin-impregnated paper is preferably within a range from 0.5 to 1.6 mm.

Resin-coated Paper

A resin-coated paper is produced by applying and/or laminating a resin to the surface of a paper. Examples of resin-coated papers include papers produced by coating the surface of a paper with a resin solution, papers produced by laminating a thermoplastic resin to the surface of a paper using a melt lamination method, papers produced by bonding a resin film to the surface of a paper, and papers produced by coating the surface of a paper with a resin solution and then bonding a resin film to the applied coating.

The resin of a resin-coated paper provides the substrate 11 with the properties required of an optical disc substrate, such as strength, rigidity, moisture and water resistance, dimensional stability and surface smoothness, and this resin includes at least one resin selected from the group consisting of polycarbonates, bisphenol A epoxy resins, copolymers of methyl methacrylate and styrene, and copolymers of acrylonitrile and styrene. Furthermore, other resins such as glues or adhesives may also exist between the paper and the resin film.

Examples of the resin film include polycarbonate films, methyl methacrylate-styrene copolymer films, and acrylonitrile-styrene copolymer films.

There are no particular limitations on the paper within the resin-coated paper, provided it is a pulp-based paper. The same papers as those described above for the resin-impregnated paper can be used as the paper.

Once the resin has been applied and/or laminated to the paper surface, the resin-coated paper can be obtained by curing, drying or solidifying the resin as required.

From the viewpoints of ensuring favorable strength for the resulting optical disc, and meeting the optical disc specifications, the thickness of the thus obtained resin-coated paper is preferably within a range from 0.5 to 1.6 mm.

Surface Smoothness

The substrate 11 requires favorable surface smoothness to enables its use within an optical disc. The centerline average roughness Ra (JIS B 0601) of at least one surface of the substrate 11 is preferably no higher than 0.5 µm, and the maximum height Rmax (JIS B 0601) is preferably no higher than 6.0 µm. Furthermore, substrates 11 in which the centerline average roughness Ra and maximum height Rmax fall within the above ranges for both surfaces of the substrate are particularly desirable.

Examples of methods of imparting favorable surface smoothness to the substrate 11 include methods in which a resin film with superior smoothness is bonded to the paper surface, methods in which following impregnation or application of the resin to the paper, surface transfer is done using a material with excellent surface smoothness (such as a glass, film, ceramic or metal), and methods in which the resin-impregnated paper or resin-coated paper is subjected to hot pressing.

Protection of Peripheral Edges

By protecting the peripheral edges of the substrate 11, deformations caused by environmental changes can be better prevented. The peripheral edges of the substrate 11 are protected by either resin coating or the fitting of a resin cover. Examples of suitable resins that can be used in the case of resin coating include urea-formaldehyde resins, melamine resins, polyamidoamines and epichlorohydrin modified products thereof, latexes such as natural rubber latexes and synthetic rubber latexes (such as SBR, NBR and polychloroprene), polyvinyl chloride, copolymers of vinyl chloride and other monomers, polyvinylidene chloride, copolymers of vinylidene chloride and other monomers, polyvinyl alcohol resins, polyacrylamides, acrylic resins, polyesters, polyolefins such as polyethylene and polypropylene, polycarbonates, and polystyrene.

Examples of suitable resins for use as resin covers include polyolefins such as polyethylene and polypropylene, polyvinyl chloride, copolymers of vinyl chloride and other monomers, polyvinylidene chloride, copolymers of vinylidene chloride and other monomers, polystyrene, ABS resins, methacrylate resins, epoxy resins, unsaturated polyester resins, phenolic resins, melamine resins, polycarbonates, polystyrene, and polyacrylonitrile.

In those cases where a hole is formed in the center of the optical disc, the inner peripheral edge generated by formation of the hole may also be protected in the same manner as the outer peripheral edge.

Recording Layer

The recording layer 13 is the layer on which information is recorded and/or the layer on which information is able to be recorded, wherein information can be recorded and/or read by irradiating the layer with a light.

The recording layer 13 may be either a layer onto which information is prerecorded during the manufacture of the optical disc, or a layer onto which information is able to be recorded after the production, and can generally be classified as one of three types of recording layer: (1) a recording layer onto which information is prerecorded during the manufacture of the optical disc, and onto which information cannot be recorded after the production (a read-only type); (2) a recording layer which contains no recorded information at the time of manufacture, and onto which information can be recorded after the production (a write-once type); and (3) a recording layer from which recorded information can be erased, and onto which information can be recorded many times (a rewritable type).

As follows is a more detailed description of each type of recording layer.

Read-only Type

Figure 2:
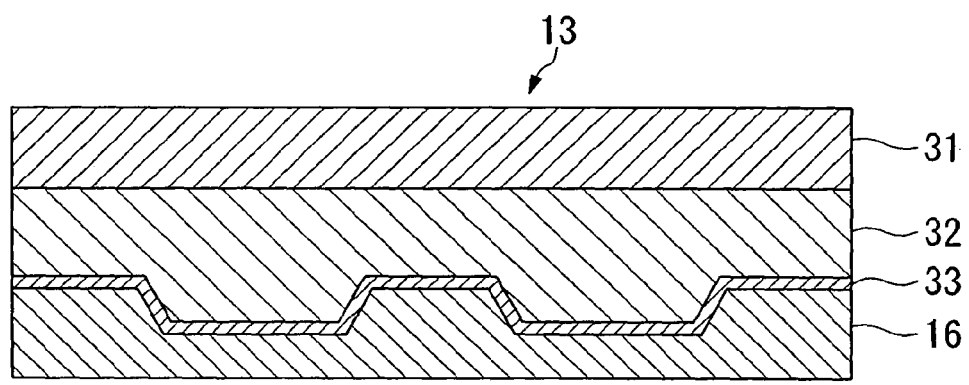
FIG. 2 is a schematic cross-sectional view showing an example of a recording layer in a read-only optical disc.

FIG. 2 is a cross-sectional view showing an example of a read-only type. This recording layer 13 includes basically a recording layer base material 31, an information pit-forming layer 32 with surface indentations that is formed on the surface of the recording layer base material 31, and a light-reflecting layer 33 that covers the indentations of the information pit-forming layer 32, wherein the recording layer base material 31 contacts the adhesive layer 12 (not shown in the drawing), and the light-reflecting layer 33 contacts the adhesive layer 16.

The recording layer base material 31 functions as a support for the recording layer 13. The recording layer base material 31 is typically a resin film. Examples of suitable resin films include polycarbonate films, methyl methacrylate-styrene copolymer films, and acrylonitrile-styrene copolymer films, polyester films such as polyethylene terephthalate and polyethylene naphthalate, polyolefin films such as polyethylene and polypropylene, polystyrene films, polyamide films, polyvinyl chloride films, polyacrylonitrile films, polyimide films, biodegradable resin films such as polylactic acid films, triacetyl cellulose films, and cyclic polyolefin films. In terms of suppressing water and moisture absorption by the substrate 11, a non-hydrophilic film is preferred as the resin film.

From the viewpoints of enabling disposal by incineration, and ensuring that incineration leads to decomposition into water and carbon dioxide, thereby minimizing environmental impact, polyolefin films formed from polymers such as low density polyethylene (LDPE), linear low density polyethylene (LLDPE), high density polyethylene (HDPE), polypropylene, amorphous cyclic polyolefins, tetracyclododecene polymers and cycloolefin polymers are particularly preferred as the above non-hydrophilic film.

Furthermore, from the viewpoint of enabling decomposition by microorganisms, so that environmental impact is minimal even if disposal is performed by burial in the ground, the use of a biodegradable resin film as the non-hydrophilic film is also preferred. Examples of biodegradable resin films that can be used include polylactic acid resins. Specific examples of polylactic acid resins include "Ecoloju"® manufactured by Mitsubishi Plastics, Inc., "Terramac"® manufactured by Unitika Ltd., and "Palgreen"® LC, manufactured by Tohcello Co., Ltd. Copolymer polyesters formed from a polyhydric alcohol such as 1,4-butanediol or pentaerythritol, and either succinic acid or adipic acid or the like can also be used as biodegradable resins. Examples of these types of biodegradable copolymer polyester resins include "Biomax"® manufactured by DuPont Corporation), and "Bionolle"® manufactured by Showa Highpolymer Co., Ltd.

In order to ensure adequate strength as a support, the thickness of the resin film is preferably 30 µm or higher.

The information pit-forming layer 32 has indentations within its surface, and these indentations are used to define the tracks and information pits. The information pit-forming layer 32 is formed by curing an ultraviolet light curable resin that contains a combination of an oligomer or monomer, such as a urethane acrylate oligomer, a polyester acrylate oligomer or a low density acrylic monomer, together with a photoinitiator; or an electron beam curable resin such as a urethane-modified acrylate resin or an acrylic-modified polyester resin.

The thickness of the information pit-forming layer 32 is typically within a range from 20 to 80 nm.

The light-reflecting layer 33 is provided conforming to the indentations of the information pit-forming layer 32, and reflects the irradiated light. The light-reflecting layer 33 is a thin film of a metal such as aluminum, aluminum alloy, silver, or silver alloy, which is formed by vacuum deposition or sputtering or the like.

Figure 3:
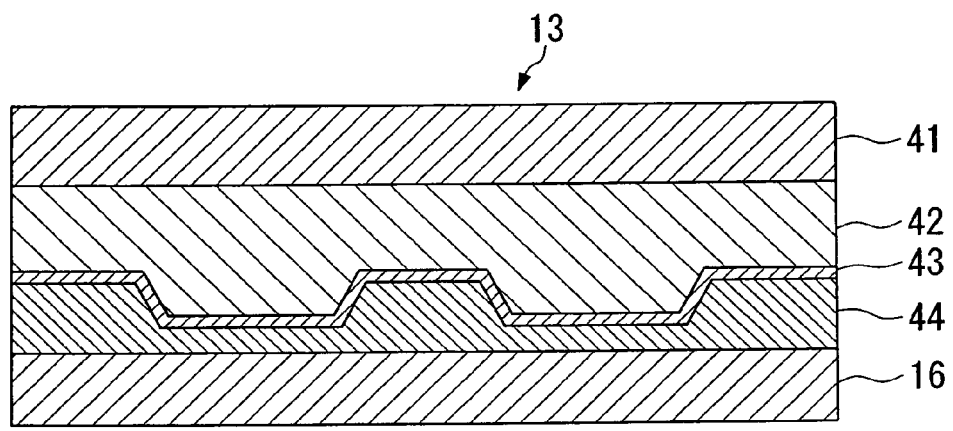
FIG. 3 is a schematic cross-sectional view showing an example of a recording layer in a write-once optical disc.

The thickness of the light-reflecting layer 33 is typically within a range from 10 to 100 nm, and the thickness of this layer is preferably uniform. Write-once Type FIG. 3 is a cross-sectional view showing an example of a write-once type. This recording layer 13 includes basically a recording layer base material 41, an information track-forming layer 42 with surface indentations that is formed on the surface of the recording layer base material 41, a light-reflecting layer 43 that covers the indentations of the information track-forming layer 42, and an information pit-recording layer 44 that is formed on the surface of the light-reflecting layer 43, wherein the recording layer base material 41 contacts the adhesive layer 12 (not shown in the drawing), and the information pit-recording layer 44 contacts the adhesive layer 16.

The recording layer base material 41 functions as a support for the recording layer 13. The recording layer base material 41 can use the same resin films as those described above for the recording layer base material 31.

The information track-forming layer 42 has indentations with a groove depth of 50 to 110 nm within its surface, and these indentations are used to define the tracks. However unlike a read-only type, no information pits are formed. In the same manner as the information pit-forming layer 32 described above, the information track-forming layer 42 is formed by curing an ultraviolet light curable resin or electron beam curable resin or the like.

The light-reflecting layer 43 is provided conforming to the indentations of the information track-forming layer 42, and reflects the irradiated light. In the same manner as described above for the light-reflecting layer 33, the light-reflecting layer 43 is a thin metal film that is formed by vacuum deposition or sputtering or the like.

The information pit-recording layer 44 is a colored film formed from an organic dye or the like, and when an information recording laser beam is irradiated onto this layer, a change in molecular structure of the organic dye occurs within the irradiated region, and the accompanying physical change (destruction) causes this region to become an information pit, enabling the recording of an information signal. Because the light transmittance of the region that has undergone this physical change decreases, when the reading light is irradiated on this region, the quantity of reflected light from the light-reflecting layer 43 also decreases, meaning the information signal can be detected in a similar manner to the case where an indented pit is formed.

Examples of suitable organic dyes include phthalocyanine-based dyes, naphthalocyanine-based dyes, and naphthoquinone-based dyes.

Figure 4:
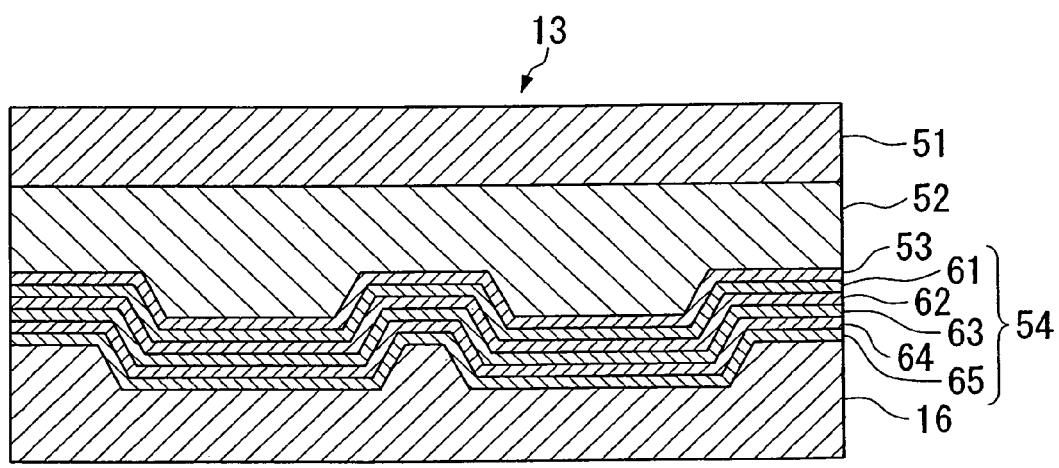
FIG. 4 is a schematic cross-sectional view showing an example of a recording layer in a rewritable optical disc.

The thickness of the information pit-recording layer 44 is typically within a range from 50 to 200 nm.
Rewritable Type FIG. 4 is a cross-sectional view showing an example of a rewritable type. This recording layer 13 includes basically a recording layer base material 51, an information track-forming layer 52 with surface indentations that is formed on the surface of the recording layer base material 51, a light-reflecting layer 53 that covers the indentations of the information track-forming layer 52, and an information pit-recording layer 54 that is formed on the surface of the light-reflecting layer 53, wherein the recording layer base material 51 contacts the adhesive layer 12 (not shown in the drawing), and the information pit-recording layer 54 contacts the adhesive layer 16.

The recording layer base material 51 functions as a support for the recording layer 13. The recording layer base material 51 can use the same resin films as those described above for the recording layer base material 31.

The information track-forming layer 52 has indentations with a groove depth of 50 to 110 nm within its surface, and these indentations are used to define the tracks. However unlike a read-only type, no information pits are formed. In the same manner as the information pit-forming layer 32 described above, the information track-forming layer 52 is formed by curing an ultraviolet light curable resin or electron beam curable resin or the like.

The light-reflecting layer 53 is provided conforming to the indentations of the information track-forming layer 52, and reflects the irradiated light. In the same manner as described above for the light-reflecting layer 33, the light-reflecting layer 53 is a thin metal film that is formed by vacuum deposition or sputtering or the like.

The information pit-recording layer 54 is a transparent dielectric film which, for example, combines three film layers into a single layer, namely a $SiO_2$ film, a GeSbTe film, and a $SiO_2$ film. The example shown in the drawing represents an information pit-recording layer with a 2-layer structure that contains a $SiO_2$ film 61, a GeSbTe film 62, a $SiO_2$ film 63, a GeSbTe film 64, and a $SiO_2$ film 65 laminated together in sequence.

Information recording, erase, and reading is done via the information pit-recording layer 54 in the manner described below.

A laser beam is focused onto the GeSbTe film to heat the film, and the film is then cooled rapidly, causing the GeSbTe film to shift to a polycrystalline or non-crystalline state, thereby recording information. If a weak laser beam that is of insufficient intensity to effect the GeSbTe film is then irradiated, then by determining whether or not the GeSbTe film is in a crystalline state, by detecting laser light that has passed through the polycrystalline or non-crystalline GeSbTe film and then reflected off the light-reflecting layer, the recorded information can be read. On the other hand, by focusing a lower intensity laser beam onto the polycrystalline or non-crystalline GeSbTe film and heating the film gradually, the GeSbTe film is returned to a crystalline state, thereby erasing the information. This recording/erase process is reversible, meaning following erase of a recording, fresh information can be recorded in its place.

Other films that may be used instead of the $SiO_2$ film include a ZnS—$SiO_2$ film, $Ta_2O_5$ film, SiN film, and AlN film. Furthermore, an AgInSbTe film may be used instead of the GeSbTe film.

Each of these films can be formed by sputtering or vacuum deposition or the like.

The thickness of each film is within a range from approximately 10 to 300 nm, and may be set in accordance with the nature of the layer and the number of films. For example, the thickness of each of the films in the information pit-recording layer 54 is $SiO_2$ film (220 nm)/GeSbTe film (13 nm)/$SiO_2$ film (25 nm)/GeSbTe film (40 nm )/$SiO_2$ film (95 nm).

Printed Layer

The printed layer 15 is generated by printing a printing ink 22 onto a printing base material 21. Printing onto the side of the adhesive layer 14, namely, onto the underside of the printing base material 21, enables the printed surface formed from the printing ink 22 to be protected, and also yields an image with a distinctive gloss and depth, and is consequently preferred.

A resin film is usually used as the printing base material 21. This resin film can use the same resin films as those described above for the recording layer base material 31. In terms of suppressing water and moisture absorption by the substrate 11, a non-hydrophilic film is preferred as the resin film. In other words, the printing base material 21 should have the same functions as those described below for the protective layer 17.

From the viewpoints of enabling disposal by incineration, and ensuring that incineration leads to decomposition into water and carbon dioxide, thereby minimizing environmental impact, polyolefin films are particularly preferred as this non-hydrophilic film. Furthermore, from the viewpoint of enabling decomposition by microorganisms, so that environmental impact is minimal even if disposal is performed by burial in the ground, the use of a biodegradable resin film as the non-hydrophilic film is also preferred.

These polyolefin films and biodegradable resin films can employ the same films as those described above for the recording layer base material 31.

The thickness of the printing base material 21 is typically within a range from 12 to 80 μm.

There are no particular limitations on the printing ink 22. From the viewpoint of minimizing environmental impact upon disposal, ideal printing inks 22 include those containing a biodegradable resin such as a polylactic acid as a binder, to which any of a variety of additives are then added. Examples of the additives include colored pigments, pigment dispersants, and viscosity regulators.

Examples of the lettering or images formed by printing include at least a display showing the type of optical disc, as well as additional information relating to the optical disc (the manufacturer, the distributor, price, memory capacity, and precautions relating to use of the disc), or halftone full color decorative images (such as images relating to the recorded information). Furthermore, space may also be provided to enable information to be written or printed onto the disc with a pencil, ballpoint pen, or inkjet printer or the like.

Protective Layer

The protective layer 17 protects the surface of the recording layer 13, and prevents the recording layer from being scratched. Furthermore, the protective layer 17 also performs a role in suppressing water and moisture absorption by the substrate 11.

Because the protective layer 17 must allow light that is irradiated onto the optical disc to pass through to the recording layer 13, the protective layer 17 is preferably a resin film with a high light transmittance.

The thickness of the protective layer 17 is typically within a range from 0.03 to 1.0 mm, and is preferably from 0.1 to 0.6 mm.

The protective layer 17 may also be formed without the use of the adhesive layer 16 described below, by applying a liquid ultraviolet light curable resin or electron beam curable resin directly to the recording layer 13 using spin coating or the like, and subsequently curing the applied resin.

Adhesive Layers

The adhesive layers 12, 14, and 16 are used for bonding each of the layers together, and are formed from an adhesive. Conventional adhesives such as acrylic adhesives can be used.

The quantity of adhesive used should be determined appropriately in accordance with the nature of the materials used within the layers being bonded. The adhesive layer 12 used for bonding together the substrate 11 and the recording layer 13 preferably substantially smoothens the surface of the recording layer 13.

Release Layers

Figure 5:
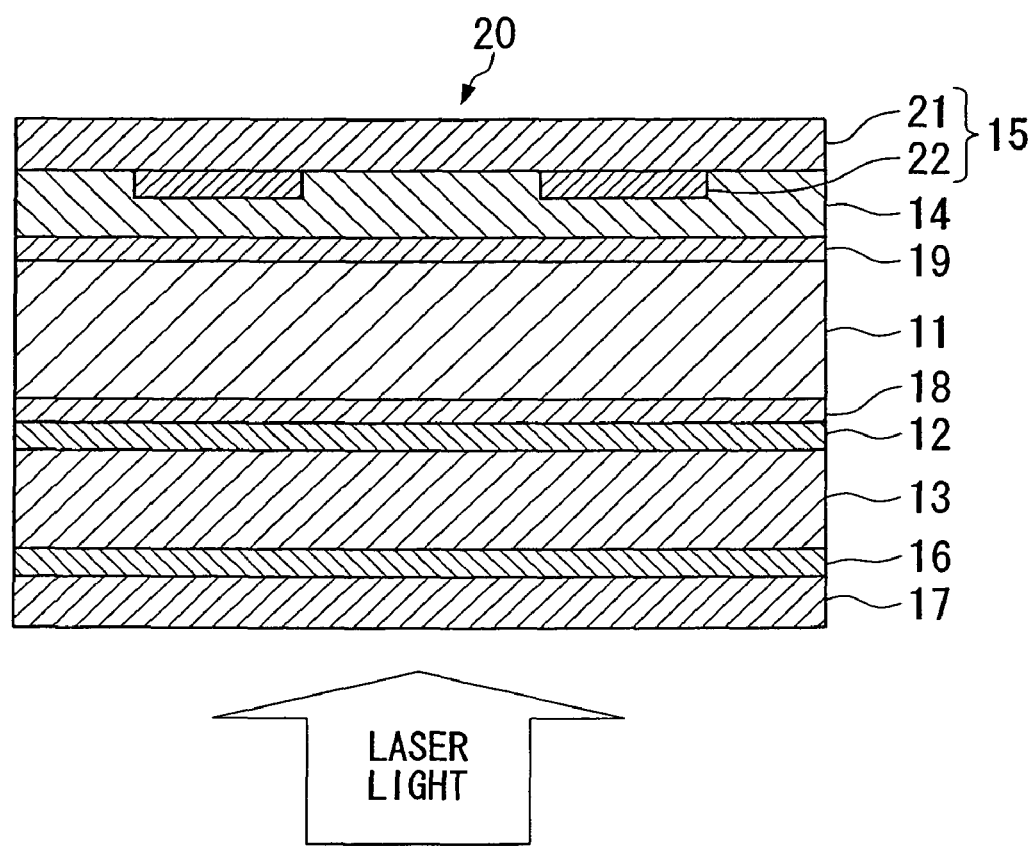
FIG. 5 is a schematic cross-sectional view showing another example of an optical disc of the present invention.

An optical disc of the present invention may also adopt a configuration shown in FIG. 5, wherein an optical disc 20 comprises release layers 18 and 19 that enable separation of the layers during disposal, between the substrate 11 and the recording layer 13, and between the substrate 11 and the printed layer 15 respectively.

The release layers 18 and 19 are preferably formed using materials with minimal surface activity, and suitable materials include polyolefins such as polyethylene and polypropylene.

The thickness of the release layers 18 and 19 is typically within a range from 5 μm to 1 mm.

Method of Manufacturing Optical Disc

Next is a description of a method of manufacturing an optical disc of the present invention.

Figure 6:
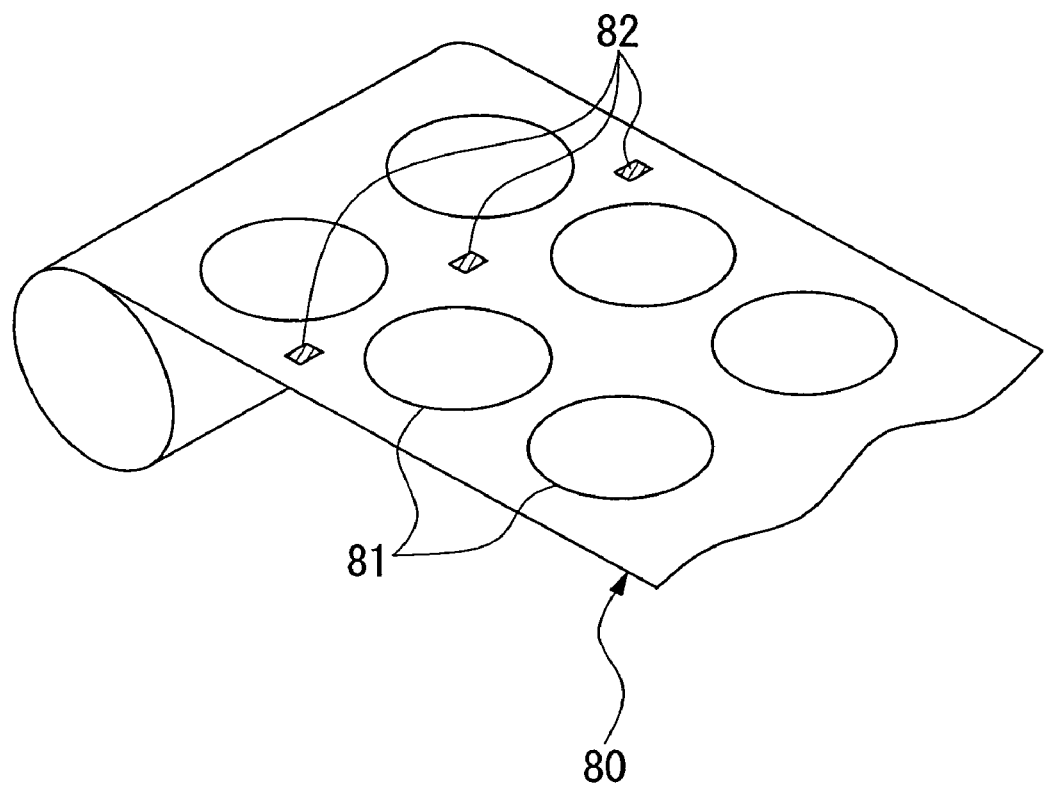
FIG. 6 is a schematic illustration showing a printed sheet and a recording sheet.

In the method of manufacturing an optical disc of the present invention, the printed layer, the substrate, the recording layer, and the protective layer are manufactured as individual sheet-like members 80 that are wound into individual rolls as shown in FIG. 6, and then in the final stages of manufacture, these sheet-like members 80 are coated with an adhesive and bonded together by pressure bonding in a predetermined sequence to generate a multilayer sheet with the desired layer structure, and discs (circular plates) are then punched out of this multilayer sheet to generate the optical discs.

As follows is a description of one example of a method of manufacturing the optical disc 20 with the layer structure shown in FIG. 5.

First, a printed sheet is prepared by printing onto the printing base material 21 (the printed sheet preparation step), the release layers 18 and 19 are formed on both surfaces of a resin-impregnated paper (the release layer formation step), and a recording layer sheet is prepared by forming tracks on the recording layer base material 31 (or 41 or 51) (the recording layer sheet preparation step). Subsequently, an optical disc source sheet with the desired layer structure is produced by bonding together the resin-impregnated paper and the printed sheet, thereby providing the printed layer 15 formed from the printed sheet on the substrate 11 formed from the resin-impregnated paper (the printed sheet bonding step), bonding together the resin-impregnated paper and the recording layer sheet, thereby providing the recording layer 13 formed from the recording layer sheet on the substrate 11 formed from the resin-impregnated paper (the recording layer sheet bonding step), and bonding a protective film to the recording layer 13, thereby providing the protective layer 17 formed from the protective film on the recording layer 13 (the protective film bonding step), and the optical discs 20 are then produced by punching discs from this source sheet.

Printed Sheet Preparation Step

Figure 7A:
FIG. 7A is a schematic illustration showing a printed sheet preparation step.

Using a process shown in FIG. 7A, the printing ink 22 is printed onto the printing base material 21 and the resulting product is wound into a roll, thereby completing preparation of a printed sheet 83. During this step, an alignment pattern 82 is also printed onto the printed sheet, as shown in FIG. 6.

Examples of suitable printing methods include offset printing, gravure printing, relief printing, screen printing, inkjet printing, and electrophotographic methods. Of these, offset printing and gravure printing methods are preferred, as they enable finely detailed images to be obtained in the case of halftone full color images. Furthermore, in those cases where variable information that is varied for each disc is to be provided, inkjet printing or electrophotographic methods are preferred.

Release Layer Formation Step

Figure 7B:
FIG. 7B is a schematic illustration showing a substrate preparation step.

Using a process shown in FIG. 7B, a polyolefin such as polyethylene is applied by melt extrusion coating to both surfaces of a resin-impregnated paper (or resin-coated paper) 84 that acts as the substrate 11, thereby forming the release layers 18 and 19 in advance. The resin-impregnated paper with the release layers 18 and 19 formed thereon (hereafter also referred to as the substrate or the substrate sheet) is wound into a roll, thereby completing preparation of the substrate (or substrate sheet) 85.

Recording Layer Sheet Preparation Step

Figure 7C:
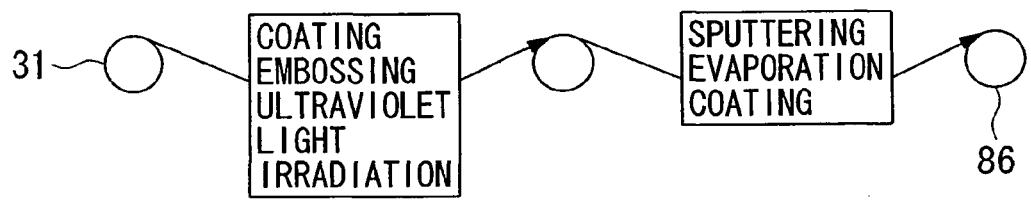
FIG. 7C is a schematic illustration showing a recording layer sheet preparation step.

Using a process shown in FIG. 7C, tracks are formed in the recording layer base material 31 (or 41 or 51), the layers required for a read-only, write-once, or rewritable type are formed, and the resulting product is wound into a roll, thereby completing preparation of a recording layer sheet 86. During this step, an alignment pattern 82 (of protrusions or indents or the like) is also formed on the recording layer sheet 86, as shown in FIG. 6.

Read-only Type

First, the recording layer base material 31 is coated with an ultraviolet light curable resin, and a transfer mold containing surface projections/depressions that correspond with tracks and information pits is pressed against the surface of the ultraviolet light curable resin, thereby transferring the projections/depressions to the ultraviolet light curable resin (an embossing process). Subsequently, the ultraviolet light curable resin is cured by irradiation with ultraviolet light, thus generating the information pit-forming layer 32. During this process, by using a transfer mold that contains not only the projections/depressions corresponding with the tracks and information pits, but also a diffraction grating pattern or a hologram pattern, a forgery prevention pattern or the like can also be formed within the information pit-forming layer 32.

Subsequently, vacuum deposition or sputtering or the like is used to form the light-reflecting layer 33 from a thin metal film on the information pit-forming layer 32.

Write-once Type

Formation of the information track-forming layer 42 and the light-reflecting layer 43 are done in the same manner as the formation of the information pit-forming layer 32 and the light-reflecting layer 33 within the read-only type. However, the transfer mold used contains no projections/depressions corresponding with information pits.

Subsequently, an organic dye is coated onto the light-reflecting layer 43, thereby forming the information pit-recording layer 44 as a colored film of the organic dye. Examples of suitable coating methods include gravure coating, microgravure coating, die coating, comma coating, air knife coating, and roll coating.

Rewritable Type

Formation of the information track-forming layer 52 and the light-reflecting layer 53 are done in the same manner as described for the write-once type.

Subsequently, sputtering or vacuum deposition or the like is used to sequentially form the $SiO_2$ film 61, the GeSbTe film 62, the $SiO_2$ film 63, the GeSbTe film 64, and the $SiO_2$ film 65 on the light-reflecting layer 43.

Bonding Steps

Figure 8:
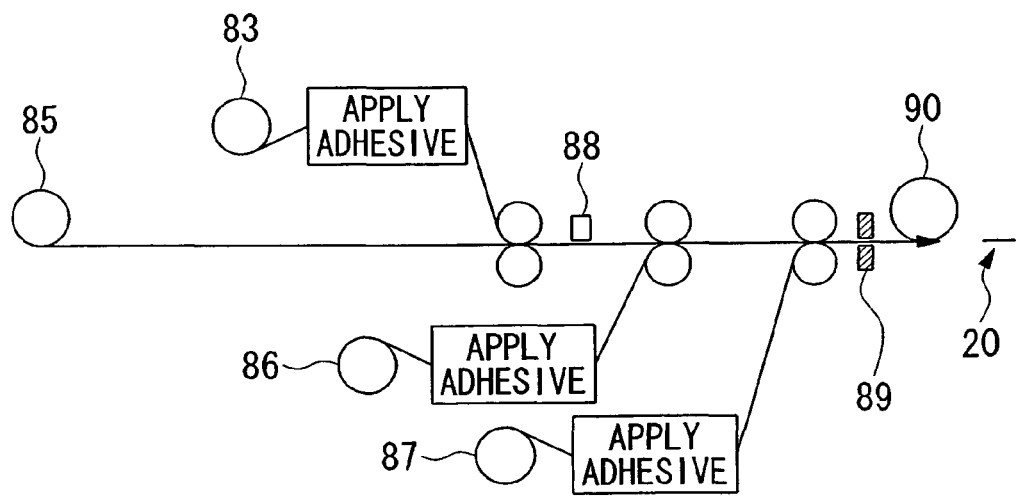
FIG. 8 is a schematic illustration showing bonding each of the sheets together.

As shown in FIG. 8, first an adhesive is applied to the printed surface of the printed sheet 83, and the printed sheet 83 is then bonded to the substrate 85 (the resin-impregnated paper or resin-coated paper with a release layer formed thereon).

Subsequently, an adhesive is applied to the recording layer sheet 86, and this sheet is then bonded to the opposite surface of the substrate 85 from the printed sheet 83. During this process, the alignment pattern 82 of the printed sheet 83 and the alignment pattern 82 of the recording layer sheet 86 are read by a position-reading sensor 88, and these positioning patterns are aligned.

An adhesive is then applied to the protective sheet 87, and this sheet is then bonded to the recording layer 13 on the substrate 85, thereby completing production of the optical disc source sheet.

Punching Step

Subsequently, the alignment patterns 82 are read by a punching position-reading sensor 89, the optical disc-shaped workpieces 81 of the source sheet are synchronized with a circular disc-shaped cutting die 90, and this circular disc-shaped cutting die 90 is then used to punch out discs from the source sheet, thus forming the optical discs 20.

The optical discs obtained in this manner may exhibit some deformation depending on the nature of the materials used in each of the layers. Accordingly, in order to ensure satisfactory smoothness, an additional subjecting the optical discs to heating from both sides using flat hotplates, thereby removing any distortions derived from the source sheet, may also be included.

Furthermore, in order to ensure that the disc maintains a favorable deformation prevention effect upon environmental changes, the shape of the peripheral edges of the disc may be altered. For example, the peripheral edges of the optical disc may be formed as a curved surface so that the protective layer or the like is able to wrap around and cover the peripheral edges of the substrate 11, provided the protective layer does not effect the recording area of the recording layer.

Formation of this curved surface can be done either using a method in which a circular disc-shaped cutting die that forms a curved surface at the peripheral edges is used during the punching out of the optical discs from the source sheet, or using a method in which following punching out of the optical disc, the periphery of the disc is formed into a curved shape using a press. By forming this type of curved surface, the surface area at the peripheral edge of the optical disc substrate 11 that is exposed to the external atmosphere can be further reduced, meaning the deformation prevention effect of the optical disc can be better maintained.

In the optical disc of the present invention described above, because a resin-impregnated paper or a resin-coated paper is used as the substrate 11, destruction of the disk at the time of disposal is a simple task, the recording layer is able to be readily separated from the substrate, and disposal of the separated substrate caused minimal environmental impact. Furthermore, in an optical disc of the present invention, because a resin-impregnated paper or a resin-coated paper is used as the substrate 11, and this resin includes at least one resin selected from the group consisting of polycarbonates, bisphenol A epoxy resins, copolymers of methyl methacrylate and styrene, and copolymers of acrylonitrile and styrene, the paper functions as a reinforcing agent, thereby providing the required strength for an optical disc, and the paper is either impregnated with the resin or surface-coated with the resin, meaning the optical disc exhibits favorable moisture and water resistance, excellent dimensional stability, minimal warping, and excellent flatness and smoothness.

Furthermore, because the optical disc includes a printed layer 12 on the opposite surface of the substrate 11 from the recording layer 13, both surfaces of the substrate 11 are covered, thereby further suppressing water and moisture absorption by the substrate 11, and further suppressing deformation of the optical disc, such as warping.

The same effects are also obtained in those cases where recording layers 13 are provided on both surfaces of the substrate.

Furthermore, because the optical disc also includes a protective layer 17 that protects the recording layer 13, not only is scratching of the recording layer 13 prevented, but water and moisture absorption by the substrate 11 can also be further suppressed, enabling even better suppression of deformation of the optical disc, such as warping.

Furthermore, if the recording layer 13 has a recording layer base material 31 (or 41 or 51) formed from a resin film, then water and moisture absorption by the substrate 11 can be further suppressed, enabling even better suppression of deformation of the optical disc, such as warping.

Furthermore, if the printed layer 15 has a printing base material 21 formed from a resin film, then water and moisture absorption by the substrate 11 can be further suppressed, enabling even better suppression of deformation of the optical disc, such as warping.

Furthermore, because release layers 18 and 19 are provided between the substrate 11 and the recording layer 13, and between the substrate 11 and the printed layer 15 respectively, the substrate 11, the recording layer 13, and the printed layer 15 can be separated at the time of disposal and disposed of individually, meaning the disposal can be done in the manner best suited to the material of each layer, thereby minimizing the impact on the environment.

Furthermore, in a method of manufacturing an optical disc according to the present invention, the substrate 11, the recording layer 13, the printed layer 15, and the protective layer 17 are prepared in advance as corresponding sheets, and these sheets are then bonded together, and consequently unlike methods in which application is done by spin coating, material wastage is minimal, and unlike methods in which the recording layer 13, the printed layer 15, and the protective layer 17 are simply laminated in sequence onto the substrate, stress caused by differences in the coefficients of thermal expansion can be avoided, meaning an optical disc with minimal warping of the substrate 11 can be produced at low cost.

Furthermore, because the method involves providing a printed sheet in advance by printing onto the printing base material 21, and subsequently bonding this printed sheet to the substrate 11, finely detailed printing can be done, meaning a finely detailed image can be obtained at low cost. Furthermore, in the printed sheet preparation step described above, variable information that is varied for each disc, such as a changing serial number, can be provided on each optical disc by printing.

An optical disc of the present invention is not restricted to the embodiments described above. Various design modifications are possible, provided they do not depart from the scope of the present invention.

For example, an optical disc of the present invention need not necessarily be a circular shape, and provided the region on which information is recorded is circular, the disc itself may be any shape, such as a rectangular shape or the like.

Furthermore, in the embodiments described above, an adhesive is used during bonding of each of the layers, but instead of using an adhesive, an adhesive layer, or an adhesive material or glue produced by forming an adhesive or glue into sheet form could also be used.

Furthermore, in the optical disc manufacturing example described above, the substrate is wound into a roll, but the substrate may develop warping while wound, making the optical discs more susceptible to deformation. Accordingly, the substrate may also be produced as a flat sheet that is not subjected to winding and consequently has no warping tendency.

Moreover, in the optical disc manufacturing example described above, the printed sheet was prepared separately and then bonded to the substrate, but the printed layer may also be formed by printing directly onto the paper used in forming a resin-coated paper by coating the paper surface with a resin, or alternatively, the printed layer may be formed by printing directly onto the substrate formed from a resin-impregnated paper produced by impregnating a paper with resin, or a resin-coated paper produced by coating the surface of a paper with resin. In the case of a resin-coated paper produced by coating the surface of a paper with resin, the printed layer may be formed on either the paper used in producing the resin-coated paper, or the resin used for coating the paper.

Furthermore, in the optical disc manufacturing example described above, the recording layer sheet was prepared separately and then bonded to the substrate, but the tracks could also be formed directly on the substrate, and the appropriate layers required for a read-only, write-once, or rewritable type subsequently formed on the substrate, thereby enabling the recording layer to be formed directly on the substrate.

EXAMPLES

As follows is a description of examples of the present invention.

Example 1 (Preparation of Printed Sheet)

A stretched polylactic acid film of a thickness of 0.04 mm (Ecoloju®, manufactured by Mitsubishi Plastics, Inc.) was subjected to gravure printing using a biodegradable polyester-based printing ink (Biotech Color® HGP, manufactured by Dainichiseika Color & Chemicals Mfg. Co., Ltd.), thereby yielding a printed sheet on which was printed a display showing the type of optical disc, additional information relating to the optical disc, and a decorative image and the like.

Preparation of Substrate

Adhesive layers formed from an adhesive were provided on both surfaces of a sheet of paper of a thickness of 0.6 mm, and polycarbonate films (sheets of Panlite®, manufactured by Teijin Ltd.) of a thickness of 0.18 mm were then bonded to both surfaces of the paper, thereby yielding a substrate with a thickness of 1.1 mm. Polyethylene was then coated onto both surfaces of the substrate by melt extrusion coating, thereby pre-forming release layers of a thickness of 0.015 mm.

Preparation of Recording Layer Sheet

Surface projections/depressions that correspond with tracks and information pits were transferred to a copper-plated roll, and the roll was then subjected to chrome plating to form a transfer mold.

A stretched high density polyethylene film with a thickness of 0.05 mm was subjected to die coating with an ultraviolet curable resin in sufficient quantity to form a film thickness of 0.1 mm, and the transfer mold was then pressed against the film surface, thereby transferring the surface projections/depressions of the mold to the surface of the ultraviolet curable resin.

Subsequently, the ultraviolet curable resin was irradiated with ultraviolet light, thereby curing the ultraviolet curable resin and forming the tracks.

Aluminum was then deposited on the tracks by vacuum deposition, thereby forming a light-reflecting layer with a thickness of 60 nm and completing the preparation of a read-only type sheet.

Bonding

Microgravure coating was used to apply a layer of an acrylic-based adhesive of a thickness of 0.005 mm to the printed surface of the printed sheet, and the printed sheet and the substrate were then bonded together.

Subsequently, microgravure coating was used to apply a layer of an acrylic-based adhesive of a thickness of 0.005 mm to the recording layer sheet, and the recording layer sheet was then bonded to the opposite surface of the substrate from the printed sheet.

Microgravure coating was then used to apply a layer of an acrylic-based adhesive of a thickness of 0.005 mm to a protective sheet (a stretched high density polyethylene film of a thickness of 0.065 mm), and this protective sheet was then bonded to the recording layer on the substrate, thus yielding an optical disc source sheet.

Punching Step

Subsequently, a circular disc-shaped cutting die was used to punch discs from the source sheet, thus forming optical discs. In order to ensure favorable smoothness of the optical discs, the discs were then sandwiched between two flat plates and heated at 50° C. for 24 hours, thereby removing any distortion.

Evaluation

The thus obtained optical discs were tested using an optical disc drive device (commercially available as DDU-1000) manufactured by Pulstec Industrial Co., Ltd., and when a test was done on reading the recorded information, the information was able to be read with no problems.

Furthermore, the substrate (+release layer), the recording layer (+adhesive layer+protective layer), and the printed layer (+adhesive layer) were able to be separated, meaning the substrate and the printed layer were able to be disposed of by ground burial. The protective layer was also able to be removed from the recording layer (+adhesive layer+protective layer), and this protective layer was then also able to be disposed of by ground burial. The thin metal film component was then recovered from the recording layer.

Example 2

With the exception of altering the preparation of the recording layer sheet in the manner described below, optical discs were prepared in the same manner as the Example 1.

Preparation of Recording Layer Sheet

Surface projections/depressions that correspond with tracks were transferred to a copper-plated roll, and the roll was then subjected to chrome plating to form a transfer mold.

A stretched high density polyethylene film with a thickness of 0.05 mm was subjected to die coating with an ultraviolet curable resin in sufficient quantity to form a film thickness of 0.1 mm, and the transfer mold was then pressed against the film surface, thereby transferring the surface projections/depressions of the mold to the surface of the ultraviolet curable resin.

Subsequently, the ultraviolet curable resin was irradiated with ultraviolet light, thereby curing the ultraviolet curable resin and forming the tracks.

Aluminum was then deposited on the tracks by vacuum deposition, thereby forming a light-reflecting layer with a thickness of 60 nm.

Subsequently, microgravure coating was used to apply a cyanine-based dye to the surface of the light-reflecting layer, thereby forming a colored film of thickness 60 nm and completing preparation of a write-once type sheet.

Evaluation

The thus obtained optical discs were tested using an optical disc drive device (commercially available as DDU-1000) manufactured by Pulstec Industrial Co., Ltd., and when tests were done for recording (writing) information and reading recorded information, both the recording and reading were able to be done with no problems.

Furthermore, the substrate (+release layer), the recording layer (+adhesive layer+protective layer), and the printed layer (+adhesive layer) were able to be separated, meaning the substrate and the printed layer were able to be disposed of by ground burial. The protective layer was also able to be removed from the recording layer (+adhesive layer+protective layer), and this protective layer was then also able to be disposed of by ground burial. The thin metal film component was then recovered from the recording layer.

Example 3

With the exception of altering the preparation of the recording layer sheet in the manner described below, optical discs were prepared in the same manner as Example 1.

Preparation of Recording Layer Sheet

Surface projections/depressions that correspond with tracks were transferred to a copper-plated roll, and the roll was then subjected to chrome plating to form a transfer mold.

A stretched high density polyethylene film with a thickness of 0.05 mm was subjected to die coating with an ultraviolet curable resin in sufficient quantity to form a film thickness of 0.1 mm, and the transfer mold was then pressed against the film surface, thereby transferring the surface projections/depressions of the mold to the surface of the ultraviolet curable resin.

Subsequently, the ultraviolet curable resin was irradiated with ultraviolet light, thereby curing the ultraviolet curable resin and forming the tracks.

Aluminum was then deposited on the tracks by vacuum deposition, thereby forming a light-reflecting layer with a thickness of 60 nm.

Subsequently, a $SiO_2$ film of thickness 220 nm, a GeSbTe film of thickness 13 nm, a $SiO_2$ film of thickness 25 nm, a GeSbTe film of thickness 40 nm, and a $SiO_2$ film of thickness 95 nm were formed sequentially on the light-reflecting layer, thereby completing preparation of a rewritable type sheet.

Evaluation

The thus obtained optical discs were tested using an optical disc drive device (commercially available as DDU-1000) manufactured by Pulstec Industrial Co., Ltd., and when tests were done for recording (writing) information, reading recorded information, erasing recorded information, and rewriting information, all of the processes, namely recording, reading, erase, and rewriting were able to be done with no problems.

Furthermore, the substrate (+release layer), the recording layer (+adhesive layer+protective layer), and the printed layer (+adhesive layer) were able to be separated, meaning the substrate and the printed layer were able to be disposed of by ground burial. The protective layer was also able to be removed from the recording layer (+adhesive layer+protective layer), and this protective layer was then also able to be disposed of by ground burial. The thin metal film component was then recovered from the recording layer.

Example 4

With the exceptions of not preparing a printed sheet, but rather forming the printed layer directly on the substrate in the manner described below, and omitting bonding the printed sheet to the substrate, optical discs were prepared in the same manner as the Example 1.
Preparation of Substrate
Adhesive layers formed from an adhesive were provided on both surfaces of a sheet of paper of a thickness of 0.6 mm, and polycarbonate films (sheets of Panlite®, manufactured by Teijin Ltd.) of a thickness of 0.18 mm were then bonded to both surfaces of the paper, thereby yielding a substrate with a thickness of 1.1 mm. Gravure printing was done onto one surface of this substrate using a biodegradable polyester-based printing ink (Biotech Colors® HGP, manufactured by Dainichiseika Color & Chemicals Mfg. Co., Ltd.), thereby forming a printed layer. Polyethylene was then coated onto the opposite surface of the substrate from the printed layer by melt extrusion coating, thereby pre-forming a release layer of a thickness of 0.015 mm.
Evaluation
The thus obtained optical discs were tested using an optical disc drive device (commercially available as DDU-1000) manufactured by Pulstec Industrial Co., Ltd., and when tests were done for recording (writing) information and reading recorded information, both the recording and reading were able to be done with no problems.
Furthermore, the substrate (+printed layer+release layer) and the recording layer (+adhesive layer+protective layer) were able to be separated, meaning the substrate was able to be disposed of by ground burial. The protective layer was also able to be removed from the recording layer (+adhesive layer+protective layer), and this protective layer was then also able to be disposed of by ground burial. The thin metal film component was then recovered from the recording layer.

Example 5

With the exceptions of not preparing a printed sheet, but rather forming the printed layer directly on the paper that constitutes the substrate in the manner described below, and omitting bonding the printed sheet to the substrate, optical discs were prepared in the same manner as the Example 1.
(Preparation of Substrate)
Gravure printing was done onto one surface of a sheet of paper of a thickness of 0.6 mm using a biodegradable polyester-based printing ink (Biotech Color® HGP, manufactured by Dainichiseika Color & Chemicals Mfg. Co., Ltd.), thereby forming a printed layer. Adhesive layers formed from an adhesive were then provided on both surfaces of the paper containing the printed layer formed thereon, and polycarbonate films (sheets of Panlite®, manufactured by Teijin Ltd.) of a thickness of 0.18 mm were then bonded to both surfaces of the paper, thereby yielding a substrate with a thickness of 1.1 mm. Polyethylene was then coated onto the opposite surface of the substrate from the printed layer by melt extrusion coating, thereby pre-forming a release layer of a thickness of 0.015 mm.
Evaluation
The thus obtained optical discs were tested using an optical disc drive device (commercially available as DDU-1000) manufactured by Pulstec Industrial Co., Ltd., and when tests were done for recording (writing) information and reading recorded information, both the recording and reading were able to be done with no problems.
Furthermore, the substrate (+printed layer+release layer) and the recording layer (+adhesive layer+protective layer) were able to be separated, meaning the substrate was able to be disposed of by ground burial. The protective layer was also able to be removed from the recording layer (+adhesive layer+protective layer), and this protective layer was then also able to be disposed of by ground burial. The thin metal film component was then recovered from the recording layer.

Example 6

With the exception of altering the preparation of the printed sheet in the manner described below, optical discs were prepared in the same manner as the Example 1.
Preparation of Printed Sheet
A polycarbonate film of a thickness of 0.04 mm (a sheet of Panlite®, manufactured by Teijin Ltd.) was subjected to gravure printing using a biodegradable polyester-based printing ink (Biotech Color® HGP, manufactured by Dainichiseika Color & Chemicals Mfg. Co., Ltd.), yielding a printed sheet on which was printed a display showing the type of optical disc, additional information relating to the optical disc, and a decorative image and the like.
Evaluation
The thus obtained optical discs were tested using an optical disc drive device (commercially available as DDU-1000) manufactured by Pulstec Industrial Co., Ltd., and when tests were done for recording (writing) information and reading recorded information, both the recording and reading were able to be done with no problems.
Furthermore, the substrate (+release layer), the recording layer (+adhesive layer+protective layer), and the printed layer (+adhesive layer) were able to be separated, meaning the substrate and the printed layer were able to be disposed of by ground burial. The protective layer was also able to be removed from the recording layer (+adhesive layer+protective layer), and this protective layer was then also able to be disposed of by ground burial. The thin metal film component was then recovered from the recording layer.

Example 7

Figure 9:
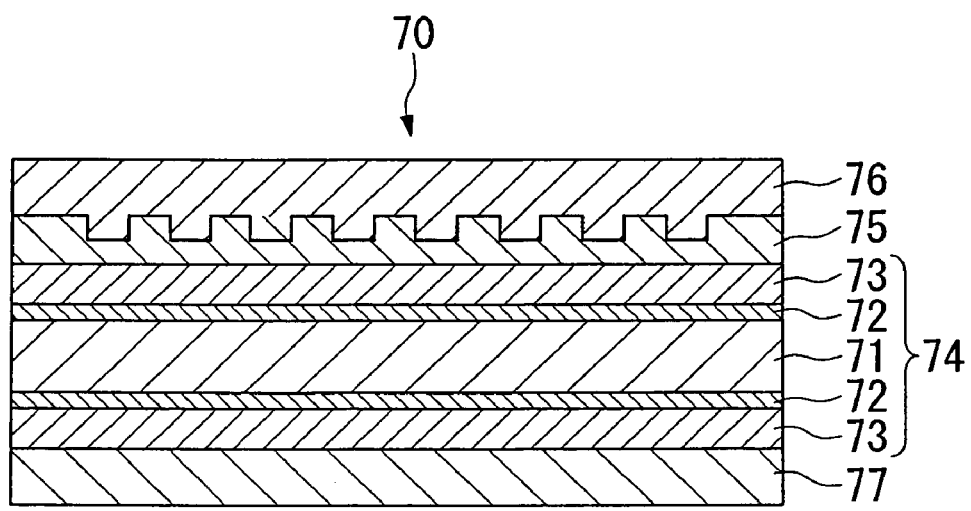
FIG. 9 is a schematic cross-sectional view showing yet another example of an optical disc of the present invention.

An optical disc 70 such as that shown in FIG. 9, including a substrate 74 produced by using adhesive layers 72 to bond polycarbonate films 73 to both surfaces of a sheet of paper 71, a recording layer 75 formed on one surface of the substrate 74, a protective layer 76 bonded to the top of the recording layer 75 via an adhesive layer (not shown in the drawing), and a protective layer 77 bonded to the opposite surface of the substrate 74 via an adhesive layer (not shown in the drawing) was prepared. As follows is a more detailed description of the manufacture of the disc.
Preparation of Substrate
Adhesive layers 72 formed from an adhesive were provided on both surfaces of a sheet of paper 71 of a thickness of 0.6 mm, and polycarbonate films 73 (sheets of Panlite®, manufactured by Teijin Ltd.) of a thickness of 0.18 mm were then bonded to both surfaces of the paper 71, thereby yielding a substrate sheet (the substrate 74) with a thickness of 1.1 mm.
Preparation of Recording Layer
Surface projections/depressions that correspond with tracks and information pits were transferred to a copper-plated roll, and the roll was then subjected to chrome plating to form a transfer mold.

Die coating was used to coat one surface of the above substrate with a sufficient quantity of an ultraviolet curable resin to form a film of a thickness of 0.1 mm, and the transfer mold was then pressed against this film surface, thereby transferring the surface projections/depressions of the mold to the surface of the ultraviolet curable resin.

Subsequently, the ultraviolet curable resin was irradiated with ultraviolet light, thereby curing the ultraviolet curable resin and forming the tracks.

Aluminum was then deposited on the tracks by vacuum deposition, thereby forming a light-reflecting layer with a thickness of 60 nm and completing the preparation of a read-only type 75 on the substrate.

Bonding

Microgravure coating was used to apply a layer of an acrylic-based adhesive of a thickness of 0.005 mm to a protective sheet (a polycarbonate film of a thickness of 0.065 mm (a sheet of Panlite®, manufactured by Teijin Ltd.)) (the protective layer 76), and this protective layer 76 was then bonded to the recording layer 75 on the substrate.

Subsequently, microgravure coating was used to apply a layer of an acrylic-based adhesive of a thickness of 0.005 mm to another protective sheet (a film of an ultraviolet curable resin of a thickness of 0.065 mm) (the protective layer 77), and this protective layer 77 was then bonded to the opposite surface of the substrate, thus yielding an optical disc source sheet Punching Step Subsequently, a circular disc-shaped cutting die was used to punch discs from the source sheet, thus forming optical discs. In order to ensure favorable smoothness of the optical discs, the discs were sandwiched between two flat plates and heated at 50° C. for 24 hours, thereby removing any distortion.

Evaluation

The thus obtained optical discs were tested using an optical disc drive device (commercially available as DDU-1000) manufactured by Pulstec Industrial Co., Ltd., and when a test was done on reading the recorded information, the information was able to be read with no problems.

Example 8

Using a different method from Example 7, an optical disc 70 shown in FIG. 9 was prepared.

Preparation of Substrate

An adhesive layer 72 formed from an adhesive was provided on one surface of a sheet of paper 71 of a thickness of 0.6 mm, and a polycarbonate film 73 (a sheets of Panlite, manufactured by Teijin Ltd.) of a thickness of 0.18 mm was then bonded to the adhesive layer, thereby yielding a substrate.

Preparation of Recording Layer Sheet

Surface projections/depressions that correspond with tracks and information pits were transferred to a copper-plated roll, and the roll was then subjected to chrome plating to form a transfer mold.

Die coating was used to coat one surface of a polycarbonate film 73 of a thickness of 0.18 mm (a sheet of Panlite®, manufactured by Teijin Ltd.) with a sufficient quantity of an ultraviolet curable resin to form a film of a thickness of 0.1 mm, and the transfer mold was then pressed against this film surface, thereby transferring the surface projections/depressions of the mold to the surface of the ultraviolet curable resin.

Subsequently, the ultraviolet curable resin was irradiated with ultraviolet light, thereby curing the ultraviolet curable resin and forming the tracks.

Aluminum was then deposited on the tracks by vacuum deposition, thereby forming a light-reflecting layer with a thickness of 60 nm. In this manner, a read-only type 75 was formed on the polycarbonate film 73, thereby yielding a recording layer sheet.

Bonding

Microgravure coating was used to apply a layer of an adhesive (the adhesive layer 72) to the recording layer sheet, and the recording layer sheet was then bonded to one surface of the substrate.

Subsequently, microgravure coating was used to apply a layer of an acrylic-based adhesive of a thickness of 0.005 mm to a protective sheet (a polycarbonate film of a thickness of 0.065 mm (a sheet of Panlite®, manufactured by Teijin Ltd.)) (the protective layer 76), and this protective layer 76 was then bonded to the paper 71 of the substrate.

Moreover, microgravure coating was used to apply a layer of an acrylic-based adhesive of a thickness of 0.005 mm to another protective sheet (a film of an ultraviolet curable resin of a thickness of 0.065 mm) (the protective layer 77), and this protective layer 77 was then bonded to the opposite surface of the substrate, thus yielding an optical disc source sheet Punching Step Subsequently, a circular disc-shaped cutting die was used to punch discs from the source sheet, thus forming optical discs. In order to ensure favorable smoothness of the optical discs, the discs were sandwiched between two flat plates and heated at 50° C. for 24 hours, thereby removing any distortion.

(Evaluation)

The thus obtained optical discs were tested using an optical disc drive device (commercially available as DDU-1000) manufactured by Pulstec Industrial Co., Ltd., and when a test was done on reading the recorded information, the information was able to be read with no problems.

INDUSTRIAL APPLICABILITY

An optical disc of the present invention, which uses a resin-impregnated paper or resin-coated paper as a substrate, is able to be readily destroyed by cutting or peeling to enable information to be protected at the time of disposal. Furthermore, the reflective layer and the recording layer can be readily separated from the substrate, meaning the reflective layer and the recording layer can be recovered separately with favorable efficiency and in a form that provides favorable transportation properties. Moreover, the separated substrate can be disposed of by incineration or ground burial or the like, meaning the impact on the environment is minimal.

The invention claimed is:

1. An optical disc, comprising:
    a substrate which is formed from either a resin-impregnated paper produced by impregnating a paper with a resin, or a resin-coated paper produced by coating a surface of a paper with a resin,
    a recording layer provided on a surface of said substrate, wherein the recording layer includes a recording layer base material and a light reflecting layer,
    a release layer which is provided between said substrate and said recording layer, said release layer being in direct contact with said substrate, and
    an adhesive layer which is provided between said release layer and said recording layer, said adhesive layer being in direct contact with said release layer and said recording layer,
    wherein the resin comprises at least one resin selected from the group consisting of polycarbonates, bisphenol A epoxy resins, copolymers of methyl methacrylate and styrene, and copolymers of acrylonitrile and styrene.

2. The optical disc according to claim 1, wherein the centerline average roughness Ra of at least one surface of said substrate is no higher than 0.5 μm, and the maximum height Rmax is no higher than 6.0 μm.

3. The optical disc according to claim 1, further comprising a printed layer provided on the opposite surface of said substrate from said surface on which said recording layer is provided.

4. The optical disc according to claim 1, wherein another recording layer is provided on the opposite surface of said substrate from said surface on which said recording layer is provided.

5. The optical disc according to claim 1, further comprising at least one protective layer.

6. The optical disc according to claim 1, wherein the recording layer base material functions as a support for said recording layer, and said recording layer base material is formed from a resin film.

7. The optical disc according to claim 3, wherein said printed layer comprises a printing base material that functions as a support for said printed layer, and said printing base material is formed from a resin film.

8. The optical disc according to claim 5, wherein said at least one protective layer is provided on both opposing surfaces of said optical disc.

9. The optical disc according to claim 3, further comprising another release layer provided between said substrate and said printed layer.

10. A method of manufacturing an optical disc, comprising:
providing a substrate formed from either a resin-impregnated paper produced by impregnating a paper with a resin or a resin-coated paper produced by coating a surface of a paper with a resin;
forming a release layer on at least one surface of said resin-impregnated paper or said resin-coated paper;
providing a recording layer sheet by forming tracks on a recording layer base material and forming a light-reflecting layer on the tracks of the recording layer sheet;
applying an adhesive layer to the recording layer sheet to form an adhesive layer in direct contact with the recording layer sheet; and
bonding the substrate and the recording layer sheet together with the adhesive layer and the release layer in direct contact, thereby providing a recording layer formed from the recording layer sheet on the substrate.

11. The method of manufacturing an optical disc according to claim 10, further comprising:
providing a printed sheet by printing onto a printing base material; and
bonding the substrate and the printed sheet together on the opposite surface of the substrate from the surface on which the recoding layer is provided, thereby providing a printed layer formed from the printed sheet on the substrate.

12. The method of manufacturing an optical disc according to claim 10, further comprising bonding a protective film to the recording layer, thereby providing a protective layer formed from the protective film on the recording layer.

13. The method of manufacturing an optical disc according to claim 10, wherein the substrate is a substrate sheet that is prepared in sheet form, wherein the substrate sheet and the recording layer sheet are produced as wound rolls, and wherein the substrate sheet and the recording layer sheet from their respective wound rolls are bonded together in said bonding of the substrate and the recording layer sheet.

14. The method of manufacturing an optical disc according to claim 11, wherein said providing of the printed sheet comprises printing variable information that is varied for each produced optical disc onto the printing base material.

15. The optical disc according to claim 5, wherein said at least one protective layer protects said recording layer.

16. An optical disc, comprising:
a substrate which is formed from either a resin-impregnated paper produced by impregnating a paper with a resin, or a resin-coated paper produced by coating a surface of a paper with a resin,
a recording layer provided on a surface of said substrate, wherein the recording layer includes a recording layer base material and a light-reflecting layer,
a release layer which is provided between said substrate and said recording layer, said release layer being in direct contact with said substrate, and
an adhesive layer which is provided between said release layer and said recording layer, said adhesive layer being in direct contact with said release layer and said recording layer.

17. The optical disc according to claim 16, further comprising a printed layer provided on the opposite surface of said substrate from said surface on which said recording layer is provided.

18. The optical disc according to claim 17, further comprising another release layer provided between said substrate and said printed layer.

* * * * *